Oct. 27, 1970

F. SOLOMON 3,536,537

METHOD OF MAKING ELECTRODE HAVING IMPROVED
GAS-RECOMBINATION PROPERTIES
Original Filed Dec. 23, 1964

INVENTOR:
Frank Solomon
BY
Karl G. Ross
AGENT 3,536,537
METHOD OF MAKING ELECTRODE HAVING IMPROVED GAS-RECOMBINATION PROPERTIES
Frank Solomon, Lake Success, N.Y., assignor to Yardney International Corporation, New York, N.Y., a corporation of New York
Continuation of application Ser. No. 616,732, Feb. 16, 1967, which is a continuation of application Ser. No. 420,668, Dec. 23, 1964. This application Jan. 24, 1969, Ser. No. 796,302
Int. Cl. H01m 13/00, 13/08
U.S. Cl. 136—120                                                   4 Claims

ABSTRACT OF THE DISCLOSURE

A Teflonated zinc electrode is disclosed for use as a negative in a battery incorporating a silver/silver-oxide positive electrode. The Teflonation of the zinc electrode facilitates the recombination of the gases generated in the sealed space above the electrode and provides unexpected extension of the lifetime of the zinc electrode. The particular construction method as well as the device in which it can be used are described.

---

Figure 1:
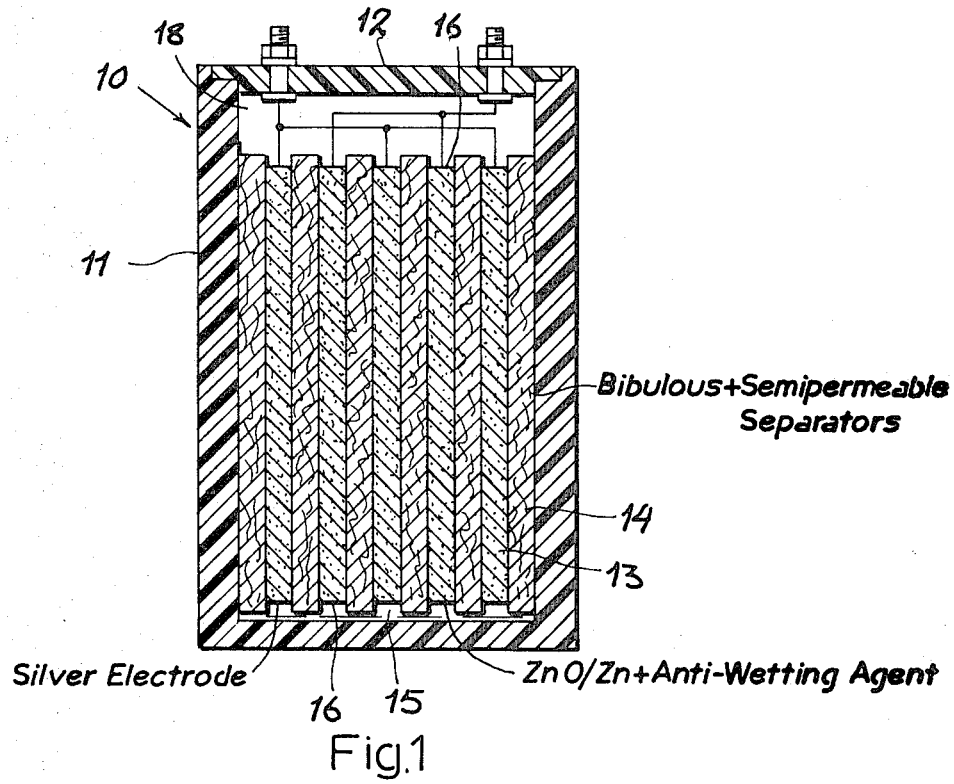

This application is a continuation of application Ser. No. 616,732, filed Feb. 16, 1967, now abandoned, which in turn is a continuation of application Ser. No. 420,668, filed Dec. 23, 1964, now abandoned.

The present invention relates to improved active electrodes for reversible current-generating electrochemical systems and systems incorporating such electrodes; more particularly, the invention is drawn to electrodes containing active masses which are dimensionally stable, are capable of improved gas recombination, and yet have considerably longer useful lives than conventional electrodes.

It is well known that battery electrodes can be provided with the capability of recombining gases produced during charge/discharge cycling of the battery cell or during stand thereof, thereby permitting the unit to be hermetically sealed. In order to classify electrodes of the type with which the present invention is concerned, it is convenient to recognize a distinction between "passive" and "active" electrode masses; for the present purposes, passive electrode materials will be those that are characterized by high surface area and catalytic activity but do not undergo significant electrochemical transformation and are not materially converted from one oxidation state to another. Active electrode masses are those which are capable of electrochemical transformation from one oxidation state to another and have a current-producing capacity related to the quantity of material so transformable.

Early in the development of hermetically sealed cells it was discovered that one or both of the electrodes of opposite polarity could, in at least one of their respective oxidation states, effect a "recombination" of gas to diminish the rate at which the internal pressures of the cell developed; recombination by these conventional electrodes occurred relatively slowly and only to limited degrees so that hermeticaly sealed cells of earlier types frequently burst or were subjected to inordinately large stresses. Strengthening of the cell casing and venting thereof proved fruitless because of the resulting increase in the weight and volume of the unit and electrolyte loss therefrom.

Under these circumstances, it was proposed to provide "auxiliary" or "third" electrodes specially designed to sustain a gas-recombination reaction at a three-phase interface between the electrolyte, the solid material of the auxiliary electrode and the gas. This reaction, which involves an electrochemical conversion of the gas (e.g. oxygen) into a component of the electrolyte (e.g. hydroxyl ions), is akin to the reaction occurring at the three-phase interface of a porous fuel-cell electrode. In both cases the solid material at th interface does not undergo a material change in oxidation state but is intended to effect a surface catalysis of the electrochemical reaction. When the major part of the gas recombination of the hermetically sealed cell was accomplished at the auxiliary electrode, the dimensions of the latter materially affected the energy density of the cell in terms of its output per unit weight or unit volume.

It is, accordingly, an important object of the present invention to provide improved active electrodes for rechargeable and reversible current-producing electrochemical systems whereby the aforementioned disadvantages are eliminated. A further object of this invention is to provide a storage cell having improved gas-recombination capabilities, long useful electrode life, and substantially optimum capacity based upon the active electrode masses.

Still another object of the invention is to provide a zinc/zinc-oxide electrode, capable of use in reversible systems having alkaline electrolytes, which minimizes shape change and is characterized by improved capabilities for gas recombination.

These objects and others which will become apparent hereinafter are based upon several interrelated discoveries which appear to constitute departures from conventional beliefs regarding battery electrodes and hermetically sealed cells incorporating same. Earlier workers with active electrodes (i.e. electrodes which consist predominantly of an active material involved in the electrochemical reaction) believed, for the most part, that thorough penetration and even saturation of a highly porous active mass with the electrolyte was the key to the suitability of an electrode in a current-generating system. It has now been found, however, that it is precisely such saturation of the pores and interstices of the active mass with electrolyte that limits the gas-recombining effectiveness of the electrode.

In a line with this discovery it has been observed that, when a hydrophobic or antiwetting substance or agent is dispersed (preferably homogeneously) throughout the electrochemically active mass, it produces a body with only limited electrolyte retentivity and saturability by electrolyte but no equivalent reduction in electrical capacity. Surprisingly, blocking of the channels by electrolyte is thus reduced and the interior thereof rendered accessible to gas for direct recombination of the latter. The investigations leading to the instant invention appear to show, moreover, that the active mass of an electrochemically reversible electrode contains a reservoir of active material which is capable of combining with oxygen in a reaction apparently devoid of the need for an electrolyte at the reaction site. The presence of the hydrophobic or antiwetting substance thus appears to produce two distinct effects with regard to gas recombination. On the one hand, it increases the extent of the three-phase interface between active material, electrolyte and gas (thereby giving rise to an improved electrochemical recombination), while in the other hand it affords access of the gas to materials which can combine with oxygen by a reaction which resembles oxidative corrosion of materials; this latter reaction will be referred to hereinafter as "direct recombination." Surprisingly, as noted above, there is no material loss in capacity of the electrode as might be expected from the fact that electrolyte is, to a significant extent, prevented from filling all of the channels of the electrode.

Presumably, the gas recombination taking place at an electrode according to the present invention is not limited by the apparent surface area of the electrode as is the case where only the exposed surfaces of an electrode body are treated with hydrophobic substances; evidence exists that gas-penetrable or partially electrolyte-free channels extend deeply into the interior of the active mass from the edges and exposed surfaces of the plate.

According to another aspect of the present invention, the hydrophobic and antiwetting agent is a synthetic resin which may be any one of a number of suitable substances mentioned hereinafter. When polytetrafluoroethylene (Teflon) and similar polymeric fluorocarbons are employed, however, the antiwetting agent simultaneously serves as a stabilizer or binder to yield a plate whose physical characteristics are a vast improvement over earlier plates of this general type. For instance, it is known that the incorporation of carboxymethylcellulose, polystyrene and like resins in a zinc/oxide electrode as a binder does not yield plates whose physical characteristics and capacity fulfills requirements for maximum utilization of active material. In fact, this decrease is disproportionately large when the volume or mass of the binder is considerable. When polymeric fluorocarbons and especially polytetrafluoroethylene are employed, however, the loss in capacity does not exceed the proportion of the resin added although the plate is found to have greater dimensional stability and substantially longer life than those using conventional binders.

It is common knowledge in the art that zinc/zinc-oxide electrodes, for example, undergo a phenomenon known as "shape change" which appears to result from the fact that during cycling of the cell, zinc oxide is dissolved from the electrode and redeposited thereon. Density gradients in the electrolyte give rise to a nonuniform redeposition of the zinc oxide while a densification occurs in the active mass at areas at which the current density differs from others. The overall result of this phenomenon is a loss of capacity and effective electrode area which has hitherto limited the life of cells employing zinc/zinc-oxide electrodes. It has now been found that the incorporation of polytetrafluoroethylene (Teflon) in an electrode of this character not only improves its gas-recombination capabilities but also prevents redistribution, to a large extent, of the active material within the electrode body and maintains a substantially homogeneous active-material density. This phenomenon is totally surprising in view of the fact that the polytetrafluoroethylene appears to remain on the plate while at least part of the active material is removed therefrom and redeposited thereon during cycling.

According to an important feature of the present invention, therefore, an active electrode for a storage cell or the like consists essentially of a body of a material adapted to undergo an electrochemical transformation in contact with an electrolyte and a minor fraction of at least one hydrophobic or anti-wetting agent dispersed in the porous mass to render the interior of the electrode accessible to the gas whose recombination is desired. In addition, the electrode can include the usual conductive network (e.g. screen, grid, wire, loops, etc.) to distribute electric current to or to remove it from the active mass. The electrochemically active mass must, according to the present invention, have at least two reversible and electrochemically alterable states and must be capable of reacting with a gas evolved by the cell during one of these states. As thus generalized, the electrode can be the positive element of an alkaline storage cell or the negative element, the two being capable of recombining gas in their substantially reduced states.

The term "hydrophobic agent," as used herein, is intended to define substances stable under operating conditions within the storage cell and capable of being dispersed in the electrochemically active mass; the agent should also have binder capabilities without materially affecting the capacity of the cell and possess electrolyte-repellent characteristics which improve the accessibility of the interior of the active mass to the gas. Such substances include natural and synthetic resins, which can be dispersed in a particulate form in the active mass, as well as waxes and the like, best results being obtained with polyfluorocarbons and polytetrafluoroethylene in particular.

The hydrophobic agent is preferably admixed with a comminuted active material in the form of a dispersion or suspension to ensure substantially uniform distribution of the antiwetting material throughout the body of the electrode. The mixture is then rendered adherent by suitable treatment (e.g. sintering, thermal fusion), the particles of the hydrophobic agent being then bonded to the electrochemically active material. It has been found that polytetrafluoroethylene suspensions in water can be mixed with the active material which, upon heating, causes a physical change in the polytetrafluoroethylene which is thereby rendered relatively tough, hard and adherent to the active material. The hydrophobic agent should be present in an amount of substantially 1–10% by weight of the electrode mass (exclusive of any conductive grid), the balance of the body consisting essentially of zinc oxide (ZnO) and between substantially 0.5 and 5% by weight HgO. The optimum polytetrafluoroethylene content is between substantially 1.5 and 5% by weight.

While an electrode of the character described, which possesses in addition to higher gas recombinability a longer useful life because of minimized migration of active material and localized densification, can be used in substantially any conventional storage battery or cell employing zinc/zinc-oxide couples, it is preferred to make use of the electrode in systems in which the positive electrode employs a silver-monovalent- or divalent-silver oxide. In these cases, a regenerated cellulose or other semipermeable separator material is interposed between the positive and negative electrodes; the improved mechanical stability of the negative electrode of the present invention prevents premature deterioration of the separator and limits localized growth of zinc along the edges of the electrode. In order to ensure that gas reaches the zinc/zinc-oxide electrode, according to the present invention, the latter may initially be wrapped or otherwise surrounded by a gas-permeable spacing material, e.g. a sheet of nonwoven polyamide fibers. Other techniques with the same end in mind, of course, also may be employed. The active electrode of the present invention, whose dimensional stability, homogeneity and useful life are considerably increased, can be partially enveloped by gas-permeable membranes with minimized deterioration of the latter and with reduced swelling of the cell assembly and structural damage to the components thereof. While these features are particularly noticeable when the positive electrode contains an active mass of silver, an active negative electrode (preferably containing zinc/zinc-oxide) can be advantageously employed with counterelectrodes containing nickel or manganese active material. In the latter cases, gas-impermeable (semi-permeable) separators can be replaced by gas-permeable ones.

Figure 2:
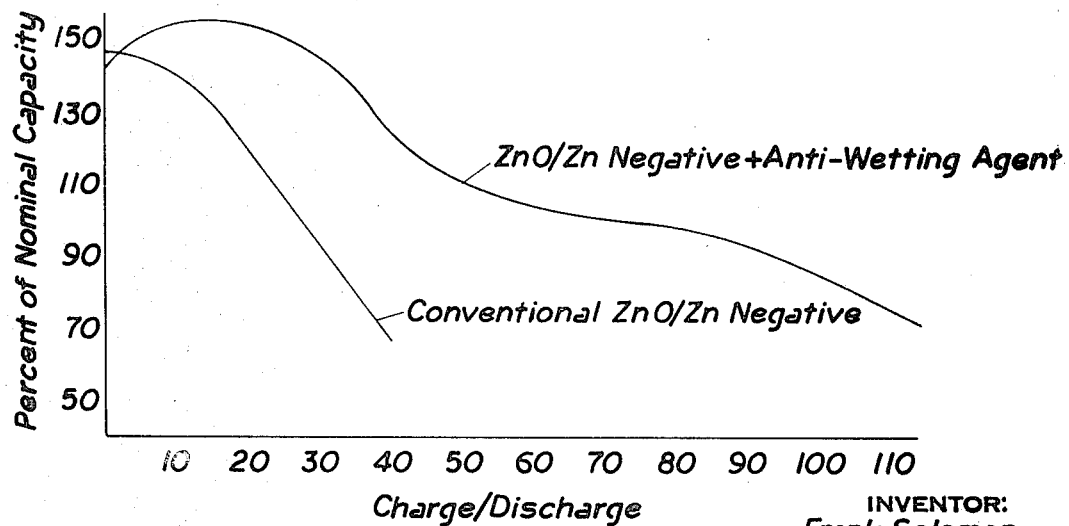

The foregoing objects, features and advantages of the present invention will become more readily apparent from the following description and specific example, reference being made to the accompanying drawing in which:

FIG. 1 is a vertical cross-sectional view through a hermetically sealed cell embodying the present invention; and FIG. 2 is a graph showing test results comparing an active electrode of the present invention with a conventional one.

In FIG. 1 of the drawing, I show a hermetically sealed cell 10 which comprises a cell casing 11 to which a cover 12 is bonded by thermal or solvent sealing to prevent the escape of gas from the interior of the cell. As diagrammatically illustrated, the cell comprises an electrode pack or assembly consisting of positive electrodes 13 (e.g. sintered-silver plaques, silver-oxide powder, hot-pressed silver powder, electrodeposited particulate silver or the like) flanked by layers of fibrous and semipermeable separators 14. The separators may include one or more layers of a fabric (e.g. nylon) resistant to the alkaline electrolyte and positioned between cellophane or other gas-impermeable membranes and the negative electrodes 16. Alternatively, the fibrous layers can be formed from nonwoven sheet materials of nylon or the like holding the semipermeable and gas-impenetrable sheet material against the negative electrodes 16 but permitting access of gas to the exposed (e.g. upper) edges thereof. The electrolyte 15 can be an alkaline solution (44% KOH) while the negative electrodes 16 have active masses of zinc/zinc-oxide and are produced as described below with reference to the specific example.

EXAMPLE

A homogeneous mixture is formed by adding between 0.5 and 5% HgO to zinc oxide and admixing it with a water emulsion (containing 60% solids) of polytetrafluoroethylene so that, after heating, the plate contains between 1 and 10% by weight of a polytetrafluoroethylene and preferably between 1.5 and 5.0%. The plate is pressed in a mold, with or without a silver or silver-plated expanded-metal grid, and then heated for 15 minutes at 300–400° C. to cure the polytetrafluoroethylene and "sinter" the plate to coherency. It has been found advantageous to sinter an unpressed mass of the mixture under these conditions and thereafter recomminute the mass, press the plate therefrom and then continue the heating to form the final and coherent plate.

More specifically, an electrode was produced with a density of 2.0–3.3 grams of zinc per cc. by mixing 2.5% by weight HgO (calculated upon the weight of the finished plate), 5% by weight polytetrafluoroethylene and the balance zinc oxide. The mixture was heated at 350° C. for 5 minutes and then comminuted until it passed through a 100-mesh sieve. The particulate material was heated for another 5 minutes at this temperature, reground and mold-pressed to form the electrode body which was subjected to an additional 5 minutes of heating. The use of paper envelopes and wrappings to hold the zinc-oxide plate in shape was completely obviated. The plate was found to have excellent mechanical properties and, when employed in a battery of the type shown in FIG. 1 against a silver/silver-oxide plate using cellophane separators in direct contact with the negative electrode, had a life as indicated in FIG. 2. From the graph, it will be seen that the improved electrode did not fall to 70% until after more than 110 charge/discharge cycles whereas a control plate identical with the improved electrode in all respects and subjected to the treatments referred to above, except omitting the antiwetting agent and employing an equivalent quantity of carboxymethylcellulose binder, had a capacity loss to about 70% of its nominal capacity after fewer than 40 charge/discharge cycles. Gaseous evolution in the cell was balanced by recombination of gas, by the improved electrode. Examination of the negative electrode after extended cycling showed that, compared with electrodes using polystyrenic and other conventional binders, there was significantly less redistribution of active materials, deterioration of the edges of the electrodes and densification of the active mass.

When the control plate and the improved electrode were incorporated in respective cells containing single negative electrodes and similarly wrapped with nonwoven polyamide sheet material, the gas-recombination rate of the improved electrode was approximately 100% greater than that containing the carboxymethylcellulose binder. Measurements of the ion double-layer capacity of plates containing polytetrafluoroethylene and produced as indicated above were found to contain up to 40% void volume (unsaturated with liquid and thus forming no double layer) while the plate free from the antiwetting agent had no detectable void volume by the double-layer measurements.

The invention described and illustrated is believed to admit of many modifications within the ability of persons skilled in the art and deemed to come within the spirit and scope of the appended claims.

What is claimed is:
1. A method of making an electrode having improved gas-recombination properties, for use in a rechargeable electrochemical system containing an alkaline electrolyte, comprising the steps of forming a substantially homogeneous mixture from an active electrode material and polytetrafluoroethylene; heating said mixture to form a coherent mass; comminuting said mass into particles and forming said particles into a porous electrode body under heat and pressure.

2. A method as defined in claim 1 wherein said active material consists predominantly of zinc or zinc oxide.

3. A method as defined in claim 2 wherein said mixture is formed by blending zinc oxide with an aqueous emulsion of polytetrafluoroethylene and thereafter drying the blend.

4. A method as defined in claim 2 or 3 wherein the polytetrafluoroethylene is admixed with the active material in a proportion of 1 to 10 parts by weight per 80 parts of zinc or zinc oxide.

References Cited
UNITED STATES PATENTS

| | | | |
|---|---|---|---|
| 2,610,219 | 9/1952 | Yardney | 136—30 |
| 2,640,864 | 6/1953 | Fishbach et al. | 126—126 |
| 2,810,008 | 10/1957 | Bikerman | 136—125 |
| 2,987,567 | 6/1961 | Freas et al. | 136—30 |
| 3,113,048 | 12/1963 | Thompson | 136—120 |
| 3,207,631 | 9/1965 | Zaromb | 136—6 |

WINSTON A. DOUGLAS, Primary Examiner

A. SKAPARS, Assistant Examiner

U.S. Cl. X.R.

75—201, 213, 222; 136—126